United States Patent [19]

Isa et al.

[11] 4,066,715

[45] * Jan. 3, 1978

[54] METHOD FOR PREPARATION OF OLEFIN OLIGOMER

[75] Inventors: Hiroshi Isa; Toshiyuki Ukigai, both of Yachiyo; Anri Tominaga, Tokyo; Michito Sato, Yokohama, all of Japan

[73] Assignee: Lion Fat & Oil Co., Ltd., Tokyo, Japan

[*] Notice: The portion of the term of this patent subsequent to Dec. 14, 1993, has been disclaimed.

[21] Appl. No.: 675,238

[22] Filed: Apr. 8, 1976

[30] Foreign Application Priority Data

Apr. 16, 1975 Japan .................................. 50-45591

[51] Int. Cl.$^2$ ................................................ C07C 3/18
[52] U.S. Cl. ............................................ 260/683.15 B
[58] Field of Search ................................ 260/683.15 B

[56] References Cited

U.S. PATENT DOCUMENTS

| 3,947,509 | 3/1976 | Isa et al. | 260/683.15 B |
| 3,952,071 | 4/1976 | Isa et al. | 260/683.15 B |

*Primary Examiner*—C. Davis
*Attorney, Agent, or Firm*—Blanchard, Flynn, Thiel, Boutell & Tanis

[57] ABSTRACT

A method of preparing an olefin oligomer by polymerizing an olefin having 6 or more carbon atoms, wherein said olefin is polymerized in the presence of a catalyst consisting of (a) a polyhydric alcohol derivative obtained by replacing the hydrogen atoms of all the hydroxyl groups of the polyhydric alcohol by either acyl groups exclusively or by acyl groups and alkyl groups, both of said groups having 1 – 20 carbon atoms, (b) an aluminum halide in an amount of 1.1 – 2.8 mole per one ester bond or ether bond possessed by said polyhydric alcohol derivative and (c) metallic aluminum powder.

6 Claims, No Drawings

METHOD FOR PREPARATION OF OLEFIN OLIGOMER

BACKGROUND OF THE INVENTION

The present invention relates to a method for preparation of olefin oligomers, and particularly relates to a method for preparation of olefin oligomers which can perfectly prevent halogen from being present in the polymerization product and provide olefin oligomers at a high yield. More particularly, the present invention is concerned with a method for preparation of olefin oligomers which is capable of optionally regulating the viscosity of the oligomers without any bad influence on the viscosity index thereof.

As the well-known methods for polymerization of olefins, there are a method employing Lewis acid catalyst such as aluminum chloride, a method employing a mixture of aluminum chloride and metallic aluminum powder or metallic zinc powder as the catalyst etc. There is also known a method of effecting polymerization by employing a liquid catalyst prepared by dissolving excess aluminum halide in a complex consisting of aluminum halide and ethyl acetate (molar ratio = 1:1) (cf. Japanese Patent Publication No. 3804/1969). However, all of these methods are defective in that they can produce no more than a polyolefin oil having a relatively high viscosity under the ordinary reaction conditions, and in the case where the reaction temperature is elevated with a view to preparing a low-viscosity polyolefin oil, not only the viscosity index of the resulting polyolefin oil will be reduced but also the yield thereof will decrease.

Another trouble with the conventional methods for polymerization of olefin, is that the halogen component of the catalyst is present in the product polyolefin oils. The presence of halogen in the product has a bad influence of grave importance on the process of after-treatment of the polymerization product. For instance, at the time of distilling the monomer and/or dimer from the polymerization product, there takes place the thermal cracking of a part of the halogen in the polyolefin oil thereby to generate hydrogen chloride, so that the distillation apparatus is corroded thereby. Furthermore, at the time of the hydrogenation of the double bonds remaining in the polymerization product carried out for the purpose of improving the heat stability as well as the oxidation stability of said product, there occurs the trouble that the hydrogenation catalyst is rendered inactive by the halogen.

SUMMARY OF THE INVENTION

It is therefore an object of the present invention to provide a method for preparing olefin oligomers which is capable of producing, at a high yield, olefin oligomers containing no halogen at all and is capable of regulating the viscosity of the oligomers at a desired value without substantial reduction of the viscosity index thereof by altering the ratio of the ingredients of the hereafter described polymerization catalyst of the present invention.

The polymerization catalyst according to the present invention is a mixture of (a) a polyhydric alcohol derivative obtained by replacing the hydrogen atoms of all the hydroxyl groups of the polyhydric alcohol by either acyl groups exclusively, or by acyl groups and alkyl groups, both said acyl group and alkyl group having 1-20 carbon atoms, (b) an aluminum halide in an amount of 1.1-2.8 mole per one ester bond and ether bond possessed by said polyhydric alcohol derivative and (c) metallic aluminum powder.

The polyhydric alcohol derivatives employed in the present invention as an ingredient of the catalyst include ethoxyethyl acetate, butoxypropyl acetate, ethoxyethoxyethyl acetate, methoxyethoxyethyl propionate, 4-methoxybutyl caproate, lauroxyethyl octanoate, ethylene glycol diacetate, ethylene glycol dicaproate, propylene glycol dipropionate, 1,3-diacetoxypropane, 1,4-diacetoxybutane, trans-1,4-diacetoxybutane, 1,5-diacetoxypentane, diethylene glycol diacetate, dibutylene glycol dipropionate, triethylene glycol didecanoate, pentaerythritol tetraacetate, etc. And, especially when ethoxyethyl acetate, butoxypropyl acetate, ethoxyethoxyethyl acetate, ethylene glycol diacetate, 1,3-diacetoxypropane of 1,4-diacetoxybutane among these polyhydric alcohol derivatives is employed, there is generally obtained a satisfactory result.

The aluminum halides used in the present invention as an ingredient of the catalyst are aluminum fluoride, aluminum chloride, aluminum bromide and aluminum iodide, among which aluminum chloride is most desirable.

A third ingredient of the polymerization catalyst of the present invention is metallic aluminum powder. The appropriate amount of said metallic aluminum powder to be present in the catalyst is in the range of 2.7-135 g per 1 mole of aluminum halide employed. In the case where the amount of the metallic aluminum powder is lower than this range, it is impossible to obtain olefin oligomers not containing halogen, while the use of the metallic aluminum powder in an amount exceeding this range, though it is permissible, will scarcely bring on any substantial furtherance of the effect.

In the polymerization method according to the present invention, an olefin having 6 or more carbon atoms is polymerized at a temperature of from 50° to 150° C. in the presence of the above described catalyst to obtain an olefin oligomer containing no halogen at all and having a kinematic viscosity at 100° F of about 35 to 150 centistokes and a viscosity index of about 120 to 140 at the yield higher than 90 percent.

The starting material olefin for use in the present invention is an alpha-olefin or an internal olefin, and to be concrete, hexene-1, octene-1, 2-ethyl octene-1, tridecene-3, octadecene-2, etc. are illustrative of the useful olefins. Also, mixture of these olefins can be used as the starting olefins.

It is an advantage achieved by the present invention that there is obtained an olefin oligomer containing no halogen at all.

The term 'olefin oligomer containing no halogen at all' herein means an olefin oligomer having properties such that, when one and the same Raney nickel catalyst is repeatedly used for performing hydrogenation treatment 10 times, wherein each of said hydrogenation treatments comprises subjecting an olefin oligomer to hydrogenation for 3 hours in the presence of the Raney nickel catalyst in an amount of 3 wt.% based on the olefin oligomer under a hydrogen pressure of 10 Kg/cm$^2$ and a temperature of 150° C, separating the catalyst from the resulting hydrogenated oil thereafter and reusing the thus separated catalyst for the next hydrogenation treatment to be performed under the same conditions as above, the bromine number of the hydrogenated oil obtained through the tenth hydrogenation treatment is less than 0.5. In this connection, in the case where any halogen is contained in the olefin oligomer, deterioration of the catalyst is remarkable at the time of the hydrogenation treatment and the catalytic efficiency thereof lowers, so that it is infeasible to obtain a hydrogenated oil having the bromine number of less than 0.5 in said tenth hydrogenation treatment.

It is further added for precaution's sake that in the present invention the measurement of the halogen content in the olefin oligomer has been conducted by an indirect means as above for there is available no apposite method of directly measuring said content at present.

Another advantage of the present invention is that it is possible to regulate the viscosity of the olefin oligomer in the range of from 35 to 150 centistokes without substantially bad influence on the viscosity index thereof by controlling the ratio of the amounts of the ingredients in the catalyst, that is, a ratio of the amount of the aluminum halide to the amount of the polyhydric alcohol derivative, which are used in the polymerization reaction according to the present invention. As already stated, the prior art could not produce an olefin oligomer having a low viscosity without elevating the polymerization temperature. And, the olefin oligomer obtained at an elevated temperature was inherently accompanied with such disadvantage as decreases of the viscosity index and the yield thereof. According to the present invention, it is possible to obtain an olefin oligomer having a desired viscosity ranging from 35 to 150 centistokes with no sacrifice of the viscosity index and the yield.

The relation between the viscosity of the olefin oligomer prepared according to the present invention and the ratio of the amount of the aluminum halide to that of the polyhydric alcohol derivative varies with the kinds of the aluminum halide and the polyhydric alcohol derivative employed. Generally, there can be obtained an olefin oligomer having a viscosity of about 40 centistokes by the use of aluminum halide in an amount of 1.1 mole per one ether bond or ester bond of the polyhydric alcohol derivative, an olefin oligomer having a viscosity of about 80 centistokes by the use of aluminum halide in an amount of 1.5 mole, an olefin oligomer having a viscosity of about 150 centistokes by the use of aluminum halide in an amount of 2.8 mole, respectively. It is to be noted that the use of aluminum halide in an amount of less or more than this range would not result in decrease or increase of viscosity of the olefin oligomer. Therefore, the appropriate mixing ratio of aluminum halide to the polyhydric alcohol derivative is in the range of 1.1 to 2.8 mole per one ester bond or ether bond of the polyhydric alcohol derivative. The amount of the aluminum halide is in the range of 0.1 to 5 mole %, preferably 1.0 to 3.0 mole %, based on the starting olefin.

The reaction temperature, strictly speaking, varies with the kind of the polyhydric alcohol derivative as well as aluminum halide employed, coupled with the ratio of these two ingredients to the metallic aluminum powder, but it is usually in the range of 50°–150° C. And, as the general tendency, in the case where the reaction temperature is too low, halogen tends to get mixed in the product oligomer, while in the case where it is too high, the viscosity index of the product oligomer tends to become low. The polymerization is usually effected under atmospheric pressure, but it is of course possible to effect the reaction under an elevated pressure.

As to the procedure for effecting the reaction, it is customary to mix the aluminum halide together with the metallic aluminum powder in the polyhydric alcohol derivative and then add the starting olefin to the resulting solution thereby to effect polymerization, but it also will do to prepare a catalyst according to the present invention beforehand by employing an appropriate inactive solvent and then add the starting olefin thereto.

The polymerization method of the present invention can be practiced even in the absence of solvent. But, a solvent may be used for the purpose of facilitating the control of the reaction temperature. The solvent for this purpose can be illustrated by n-pentane, n-octane, isooctane, trichloroethane, tetrafluoroethane, etc. The appropriate amount of the solvent for use in effecting the reaction is in the range of ¼–2 times as much as the starting olefin (by volume).

After completing the reaction, the polymerization product is subjected to distillation or extraction treatment by the conventional method thereby to separate the unreacted olefin and/or olefin dimer mixed in the polymerization product. If it is desired to improve the oxidation stability and/or thermal stability of the product oligomer, it can be easily effected by subjecting said oligomer to hydrogenation treatment by the use of a typical hydrogenation catalyst such as Raney nickel, nickel on kieselguhr, etc.

As will be understood from the foregoing elucidation, according to the present invention, it is possible not only to obtain an olefin oligomer containing no halogen at all and having a viscosity of 35 to 150 centistokes and a viscosity index of about 130 at a yield of 90 percent or more but also to adjust the viscosity of the product oligomer to a desired value by controlling the ratio of the ingredients in the catalyst employed. Therefore, it is to be said that the present invention provides an extremely useful method for preparation of an olefin oligomer which is qualified for use as a gas turbine oil, a hydraulic fluid for aircraft, an insulating oil, a cosmetic base and the like.

DESCRIPTION OF THE PREFERRED EMBODIMENTS

After putting aluminum chloride and metallic aluminum powder in various amounts shown in the following Table-I in a 1 l glass autoclave with stirrer, by adding polyhydric alcohol ester thereto while stirring, elevating the temperature up to 100° C and continuing the stirring for 3 hours, varieties of catalysts were prepared. Subsequently, by adding 600 g of the respective starting olefins as shown in Table-I to each of the thus obtained catalysts dropwise, polymerization was effected at 100° C for 5 hours. The kind and amount of the polyhydric alcohol esters employed were as shown in Table-I. After completing the reaction, ammonia gas was blown into the polymerization product thereby to inactivate the catalyst and the thus precipitated catalyst was removed by filtration. Thereafter, the polymerization product was subjected to distillation to remove the unreacted olefin and olefin dimer therefrom, whereby a polyolefin oil was obtained respectively.

Table-I

| Run No. | Olefin | (a)Polyhydric alcohol ester | (b)Aluminum chloride (molar ratio of (b) to 2(a)) | Al powder |
|---|---|---|---|---|
| 1* | octene-1 | ethylene glycol diacetate 6.6 g | 12 g (1.0) | — |
| 2* | " | — | " (—) | 1.2 g |
| 3 | " | ethylene glycol diacetate 6.0 g | " (1.10) | " |
| 4 | " | ethylene glycol diacetate 4.9 g | " (1.35) | " |
| 5 | " | ethylene glycol diacetate 3.3 g | " (2.00) | " |
| 6 | " | ethylene glycol diacetate 2.7 g | " (2.45) | " |
| 7 | " | ethoxyethyl acetate 5.4 g | " (1.1) | " |
| 8 | " | ethoxyethyl acetate 4.0 g | " (1.49) | " |
| 9 | " | ethoxyethyl acetate 3.7 g | " (1.61) | " |
| 10 | " | ethoxyethyl acetate 2.7 g | " (2.21) | " |
| 11 | olefin mixture | 1,3-diacetoxypropane 6.5 g | " (1.1) | " |
| 12 | " | 1,3-diacetoxypropane 4.8 g | " (1.5) | " |
| 13 | " | 1,3-diacetoxypropane 3.6 g | " (2.0) | " |
| 14 | " | 1,3-diacetoxypropane 2.9 g | " (2.5) | " |
| 15* | " | 1,4-diacetoxybutane 5.2 g | " (1.5) | 0.12 g |
| 16 | " | 1,4-diacetoxybutane 5.2 g | " (1.5) | 0.24 g |
| 17 | " | 1,4-diacetoxybutane 5.2 g | " (") | 2.43 g |
| 18 | " | 1,4-diacetoxybutane 5.2 g | " (") | 12.15 g |

(Remarks)
1. *represents a run for reference purpose.
2. The olefin mixture in Run Nos. 11 – 18 was a mixture composed of -olefins having 6, 8 and 10 carbon atoms, respectively, at the molar ratio of 1:1:1.

The polyolefin oil obtained in each run was evaluated with respect to its yield, viscosity and viscosity index. The results are listed in Table-II.

And, when 500 g each of the respective polyolefin oils obtained in these runs were subjected to hydrogenation treatment under a hydrogen pressure of 10 Kg/cm$^2$ and a temperature of 150° C for 3 hours in the presence of 15 g of Raney nickel catalyst and the bromine number of the resulting hydrogenated oil was measured. The results were as shown in Column-5 of Table-II.

Further, the amount of halogen contained in the respective polyolefin oils was evaluated through the following procedure. First, the distillation apparatus used in removing the unreacted olefin and olefin dimer from the polymerization product was examined to confirm whether there was any corrosion thereof. The result of said examination was as shown in Column-6 of Table-II. The showings in Column-7 of Table-II are illustrative of the frequency of repeated uses of one and the same catalyst for the foregoing hydrogenation treatment of polyolefin oil, coupled with the bromine number of the hydrogenated oil obtained on that occasion. As has already been explained, a polyolefin oil which can be converted to a hydrogenated oil having a bromine number of less than 0.5 even by means of a catalyst employed for the tenth time can be considered as simply free from halogen.

Table II

| | Properties of Polyolefin oils | | | | | |
|---|---|---|---|---|---|---|
| | Polyolefin oil | | | | | |
| Run No. | Yield (%) | Kinematic viscosity at 100° F (centistoke) | Viscosity index (VIE) | Bromine number of hydrogenated oil | Corrosion of hydrogenation apparatus | Frequency of reuse and bromine number |
| 1* | 83 | 19.5 | 128 | 0.2 | some | 3 times; 3.0 |
| 2* | 77 | 32.5 | 105 | 0.3 | nil | no deterioration |
| 3 | 95 | 37.4 | 128 | 0.2 | " | 10 times; 0.3 |
| 4 | 96 | 65.6 | 128 | 0.2 | " | 10 times; 0.3 |
| 5 | 97 | 110.9 | 128 | 0.2 | " | 10 times; 0.3 |
| 6 | 97 | 135.7 | 127 | 0.2 | " | 10 times; 0.3 |
| 7 | 93 | 50.3 | 128 | 0.2 | nil | 10 times; 0.3 |
| 8 | 95 | 87.7 | 128 | 0.2 | " | 10 times; 0.3 |
| 9 | 96 | 115.9 | 127 | 0.2 | " | 10 times; 0.3 |
| 10 | 96 | 143.2 | 127 | 0.2 | " | 10 times; 0.3 |
| 11 | 91 | 34.7 | 129 | 0.2 | " | 10 times; 0.3 |
| 12 | 93 | 75.2 | 128 | 0.2 | " | 10 times; 0.3 |
| 13 | 93 | 103.4 | 128 | 0.2 | " | 10 times; 0.3 |
| 14 | 95 | 131.5 | 127 | 0.2 | " | 10 times; 0.3 |
| 15 | 89 | 80.8 | 129 | 0.3 | some | 3 times; 3.5 |
| 16 | 94 | 81.5 | 128 | 0.2 | nil | 10 times; 0.3 |
| 17 | 95 | 83.3 | 128 | 0.2 | " | 10 times; 0.3 |

Table II-continued

| | | Polyolefin oil | Properties of Polyolefin oils | | | |
|---|---|---|---|---|---|---|
| Run No. | Yield (%) | Kinematic viscosity at 100° F (centistoke) | Viscosity index (VIE) | Bromine number of hydrogenated oil | Corrosion of hydrogenation apparatus | Frequency of reuse and bromine number |
| 18 | 95 | 83.1 | 127 | 0.2 | " | 10 times; 0.3 |

(Remarks) 1. *represents a run for reference purpose.

What is claimed is:

1. A method or preparing an olefin oligomer, which comprises polymerizing at a temperature of from 50° to 150° C, an olefin or a mixture of olefins having 6 or more carbon atoms, in the presence of a catalyst mixture of (a) a polyhydric alcohol derivative obtained by replacing the hydrogen atoms of all the hydroxyl groups of the polyhydric alcohol by either acyl groups exclusively or by acyl groups and alkyl groups, both of said groups having 1 to 20 carbon atoms, (b) an aluminum halide in an amount of 1.1 to 2.8 mole per one ester bond or ether bond of said polyhydric alcohol derivative, and (c) metallic aluminum powder; and recovering an olefin oligomer from the polymerization reaction mixture.

2. A method according to claim 1, wherein the amount of metallic aluminum powder contained in said catalyst mixture is in the range of from 2.7 to 135 g per one mole of aluminum halide contained in said catalyst mixture.

3. A method according to claim 1, wherein said polyhydric alcohol derivative is selected from the group consisting of ethoxyethyl acetate, butoxypropyl acetate, ethoxyethoxyethyl acetate, ethylene glycol acetate, 1,3-diacetoxypropane and 1,4-diacetoxybutane.

4. A method according to claim 1, wherein the amount of aluminum halide contained in said catalyst mixture is in the range of from 0.1 to 5 mol. %, based on said olefin.

5. A method according to claim 1, wherein said polyhydric alcohol derivative is mixed with the aluminum halide and metallic aluminum powder and then said olefin is added to the catalyst mixture.

6. A method according to claim 1, wherein said polymerization is effected in a solvent selected from the group consisting of n-pentane, n-octane, iso-octane, trichloroethane and tetrafluoroethane in an amount of 25-200% by volume, based on the olefin.

* * * * *